US012478795B2

(12) United States Patent
Muntermann et al.

(10) Patent No.: US 12,478,795 B2
(45) Date of Patent: Nov. 25, 2025

(54) METHOD FOR ADJUSTING AN APPARATUS FOR THE TREATMENT USING NUCLEAR SPIN RESONANCES

(71) Applicant: Axel Muntermann, Wetzlar (DE)

(72) Inventors: Axel Muntermann, Wetzlar (DE); Margit Egg, Matrei am Brenner (AT)

(73) Assignee: MedTec Medizintechnik GmbH, Wetzlar (DE)

( * ) Notice: Subject to any disclaimer, the term of this patent is extended or adjusted under 35 U.S.C. 154(b) by 164 days.

(21) Appl. No.: 16/628,646

(22) PCT Filed: Jul. 2, 2018

(86) PCT No.: PCT/EP2018/067839
§ 371 (c)(1),
(2) Date: Jan. 3, 2020

(87) PCT Pub. No.: WO2019/007912
PCT Pub. Date: Jan. 10, 2019

(65) Prior Publication Data
US 2020/0129777 A1 Apr. 30, 2020
US 2022/0339458 A2 Oct. 27, 2022

(30) Foreign Application Priority Data
Jul. 4, 2017 (DE) .......................... 102017114856.6

(51) Int. Cl.
*A61N 2/02* (2006.01)
*A61B 5/00* (2006.01)
(Continued)

(52) U.S. Cl.
CPC ............ *A61N 2/02* (2013.01); *A61B 5/02055* (2013.01); *A61B 5/4812* (2013.01); *C12N 13/00* (2013.01);
(Continued)

(58) Field of Classification Search
CPC ...... A61N 2/02; A61N 2/004; A61B 5/02055; A61B 5/4812; A61B 5/021; A61B 5/024;
(Continued)

(56) References Cited

U.S. PATENT DOCUMENTS 5,725,558 A 3/1998 Warnke
6,461,289 B1 10/2002 Muntermann
(Continued)

FOREIGN PATENT DOCUMENTS

CN 102123762 7/2011
DE 102004006192 A1 9/2005
(Continued)

OTHER PUBLICATIONS

Adolf M. Sandbichler et al., "Metabolic Plasticity Enables Circadian Adaptation to Acute Hypoxia in Zebrafish Cells". "Cellular Physiology and Biochemistry", Apr. 19, 2018, DOI: 10.1159/00048905, pp. 1159-1174, 46/3.
(Continued)

*Primary Examiner* — Sunita Reddy
(74) *Attorney, Agent, or Firm* — Kaplan Breyer Schwarz, LLP (57) ABSTRACT

The invention relates to a method for adjusting an apparatus for treatment using nuclear magnetic resonances. The chronotype of the user is determined. The apparatus is adjusted on the basis of this determination.

14 Claims, 6 Drawing Sheets

(51) Int. Cl.
 A61B 5/0205 (2006.01)
 A61B 5/021 (2006.01)
 A61B 5/024 (2006.01)
 A61B 5/0531 (2021.01)
 C12N 13/00 (2006.01)
 G01N 24/08 (2006.01)
(52) U.S. Cl.
 CPC .............. *G01N 24/08* (2013.01); *A61B 5/021* (2013.01); *A61B 5/024* (2013.01); *A61B 5/0531* (2013.01); *C12N 2529/00* (2013.01)
(58) Field of Classification Search
 CPC ....... A61B 5/0531; A61B 5/01; A61B 5/0205; A61B 5/4836; C12N 13/00; C12N 2529/00; G01N 24/08
 USPC ....................................................... 600/9–15
 See application file for complete search history.

(56) References Cited

U.S. PATENT DOCUMENTS

| | | | |
|---|---|---|---|
| 8,167,784 | B1 | 5/2012 | Honeycutt et al. |
| 2003/0069464 | A1 | 4/2003 | Muntermann et al. |
| 2006/0145457 | A1 | 7/2006 | Prenzel et al. |
| 2010/0057655 | A1 | 3/2010 | Jacobson et al. |
| 2010/0072996 | A1* | 3/2010 | Jacobson ............... A61N 2/002 324/309 |
| 2011/0118535 | A1* | 5/2011 | Muntermann ........... A61N 2/02 600/13 |
| 2014/0303424 | A1 | 10/2014 | Glass |
| 2015/0316627 | A1 | 11/2015 | Haishi et al. |
| 2017/0100589 | A1 | 4/2017 | Schwab et al. |
| 2018/0050218 | A1* | 2/2018 | Copty .................. A61B 5/0077 |

FOREIGN PATENT DOCUMENTS

| | | |
|---|---|---|
| DE | 102004058722 A1 | 6/2006 |
| DE | 102014015198 A1 | 4/2016 |
| EP | 0005713 A1 | 12/1979 |
| EP | 1089792 B1 | 5/2006 |
| JP | 07-506754 A | 7/1995 |
| JP | 2001-520094 A | 10/2001 |
| JP | 2002-153268 A | 5/2002 |
| JP | 2002518145 A | 6/2002 |
| JP | 2003-010230 A | 1/2003 |
| JP | 2004-290629 A | 10/2004 |
| JP | 2009-525141 A | 7/2009 |
| JP | 2015-515274 A | 5/2015 |
| JP | 2015-208607 A | 11/2015 |
| WO | 96/39493 A1 | 12/1996 |
| WO | 99/66986 A1 | 12/1999 |
| WO | 2010/025114 A1 | 3/2010 |
| WO | 2011/089540 | 7/2011 |
| WO | 2015/157712 A2 | 10/2015 |

OTHER PUBLICATIONS

Authorized Officer: Beck, Ewa, International Search Report issued in counterpart PCT application No. PCT/EP2018/067839, Oct. 25, 2018, 9 pp. w/ translation.
Authorized Officer: Du Ning (Dr), Search Report and Written Opinion issued in counterpart Singapore patent application No. 11202000056Y, Jun. 1, 2021, 9 pp.
Authorized Officer: Nora Lindner, English translation of International Preliminary Report on Patentability issued in counterpart PCT application No. PCT/EP2018/067839, Jan. 20, 2020, 9 pp.
Bernd Pelster et al., "Multiplicity of Hypoxia-Inducible Transcription Factors and Their Connection to the Circadian Clock in the Zebrafish". "Physiological and Biochemical Zoology", Jan. 14, 2015, DOI: 10.1086/679751, pp. 146-157, 88/2.
Bibiane Steinecker-Frohnwieser et al., "The Influence of Nuclear Magnetic Resonance Therapy (NMRT) and Interleukin IL1-b Stimulation on Cal 78 Chondrosarcoma Cells and C28/12 Chondrocytes", "Journal of Orthopedics & Rheumatology", May 1, 2014, ISSN: 2334-2846, 10 pp., 1(3):9.
Office Action issued in counterpart German patent application No. 102017114856.6, Mar. 21, 2018, 9 pp. w/ translation.
Julien Q. M. Ly et al., "Circadian regulation of human cortical excitability", "Nature Communications", Jun. 24, 2016, DOI: 10.1038/ncomms11828, 10 pp., vol. 7.
Margit Egg et al., "Chronodisruption increases cardiovascular risk in zebrafish via reduced clearance of senescent erythrocytes", "Chronobiology International", Jan. 28, 2014, Informa Healthcare USA, Inc., DOI: 10.3109/07420528.2014.889703, 10 pp.
Margit Egg et al., "Linking Oxygen to Time: The Bidirectional Interaction Between the Hypoxic Signaling Pathway and the Circadian Clock", "Chronobiology International", Nov. 25, 2012, DOI: 10.3109/07420528.2012.754447, 20 pp.
Maria Luisa Fanjul-Moles et al., "Relationship between Oxidative Stress, Circadian Rhythms, and AMD", Oxidative Medicine and Cellular Longevity, Oct. 26, 2015, Hindawi Publishing Corporation, 18 pp., vol. 2016, http://dx/doi.org/10.1155/2016/7420637.
Massimiliano Gobbo et al., "Neuromodulation and Cognitive Rehabilitation: Addressing the Methodological Issue of Circadian Rhythms", "Frontiers in Psychiatry", Oct. 27, 2014, DOI: 10.3389/fpsyt.2014.00150, 3 pp., vol. 5.
Regina Oliva et al., "Nuclear magnetic resonance affects the circadian clock and hypoxia-inducible factor isoforms in zebrafish", "Biological Rhythm Research", Aug. 10, 2018, Informa UK Limited, 20 pp., https://doi.org/10.1080/09291016.2018.1498194.
Stjepan Vidacek et al., "Personality differences in the phase of the circadian rhythms: a comparison of morningness and extraversion", "Ergonomics", Oct. 31, 1987, pp. 873-888, vol. 31, No. 6.
W. Kullich et al., "One-year-survey with multicenter data of more than 4,500 patients with degenerative rheumatic diseases treated with therapeutic nuclear magnetic resonance", "Journal of Back and Musculoskeletal Rehabilitation", dated 2013, DOI 10.3233.BMR-2012-00362, pp. 93-104, vol. 26.
Office Action issued in counterpart German patent application No. 102017114856.6, Mar. 23, 2020, 10 pp. w/ translation.
Office Action issued in Canadian patent application No. 3068770, Jan. 18, 2022, 5 pp.
Nicole Budney, "Effects of nuclear magnetic resonance therapy on the dynamics of liver regeneration", English translation of abstract of Inaugural Dissertation, dated 2015, 115 pp.
Office Action issued in Japanese patent application No. 2020-500136, Nov. 17, 2021, 10 pp. w/ translation.
Office Action issued in Chinese Patent Application No. 201880045118.2 on Oct. 26, 2023 and English Translation thereof.
Office Action issued in Japanese Patent Application No. 2023-025866 on May 2, 2024 and English Translation.
Office Action issued in European patent application No. 18739793.0, Jun. 21, 2022, 10 pp, w/ translation.
Notice of Reasons for Refusal issued in Japanese patent application No. 2020-500136, Sep. 30, 2022, 8 pp. w/ translation.
Office Action issued in Japanese Patent Application No. 2023-025866, Sep. 9, 2025, 6 pp. w/ translation.

* cited by examiner

METHOD FOR ADJUSTING AN APPARATUS FOR THE TREATMENT USING NUCLEAR SPIN RESONANCES

FIELD OF THE INVENTION

The invention relates to a method for adjustment, selective control, value acquisition, readjustment and in particular calibration of an apparatus for treatment using nuclear magnetic resonances. The invention also relates to an apparatus for treatment using nuclear magnetic resonance, to a treatment system, and to the use of nuclear magnetic resonances in particular for therapeutic and cosmetic purposes.

BACKGROUND OF THE INVENTION

It is known to use nuclear magnetic resonance apparatuses to achieve therapeutic and cosmetic effects.

The therapeutic effect in the treatment of human or animal tissue with nuclear magnetic resonances has already been described in European patent EP 1 089 792 B1 (patent holder Axel Muntermann).

The therapy apparatuses operated under the trade name MBST® are apparatuses in which, in the treatment zone, a magnetic field having a homogeneous field strength is superimposed by a perpendicularly irradiated alternating field in order to achieve nuclear magnetic resonances in the treatment zone. Nuclear magnetic resonances can be generated in the treatment zone by appropriately tuning the frequency of the alternating field to the field strength of the perpendicular homogeneous field. The field strength of the homogeneous magnetic field is modulated with a modulation frequency $f_m$ and is thus composed of a basic magnitude and a varying modulation magnitude. Due to the modulation, Larmor condition is achieved once per cycle, so that nuclear magnetic resonances are generated cyclically in the treatment volume.

Inhomogeneities of the basic static field $B_0$ are compensated via the Adiabatic Fast Passage (AFP) path, which causes reversal of nuclear spin orientations.

A receiver coil with electronic monitoring electronics introduced into the treatment unit can be used to optically and acoustically monitor the proper functioning of the nuclear magnetic resonance treatment field, the treatment parameters, compensation of influencing interfering factors such as metals in the treatment area, changes in the field strength and intensity of the energy dose introduced into the body, the required resonance conditions, and other predetermined important test parameters to use them for readjustment processes with regard to quality, effectiveness and safety.

It has been found that the treatment using nuclear magnetic resonances permits to achieve cosmetic effects, for example in the treatment of connective tissue weakness of the skin and cellulite, as well as therapeutic effects in all areas of disturbed or degenerative cell functions within the range of the joints of the bones, the organs, ligaments, muscles, tendons, both in post-operative wound healing, in skin burns, metabolic or circulatory disorder related to the bone, fracture healing, etc., as well as in other regenerative areas.

The body's own signals and electrical processes are becoming increasingly important in science. The most original signal is, for example, the ECG or the EEG.

Studies show that piezoelectric processes in the area of cell regeneration (ATP) are absolutely necessary in order to compensate or maintain disturbed cell function (Steinecker-Frohnwieser B, Weigl L, Weberhofer G, Kullich W, Kress HG. The Influence of Nuclear Magnetic Resonance Therapy (NMRT) and Interleukin IL1-b Stimulation on Cal 78 Chondrosarcoma Cells and C28/I2 Chondrocytes. J Orthopedics Rheumatol. 2014; 1(3):9).

If these are missing or if they are only insufficiently generated (lack of kinetic energy due to pushing and pulling processes), degeneration effects will occur which can be compensated very effectively and efficiently by injected nuclear magnetic resonance fields.

Fundamental to this is the observance of the transmission paths in resonance to the regeneration site of the selected cell group (cartilage, bone, skin, organ cells, etc.)

Studies have provided evidence that the monitoring and control electronics of the nuclear magnetic resonance technique can be exploited to increase, in a highly significant manner, the oxygen level (hypoxia) and the ATP of the cells after nuclear magnetic resonance treatments (see Steinecker-Frohnwieser et al.), and to accelerate or slow down the cell division rate as a function of the control pattern (N. Budny; Com. Director Prof. Dr. med. D. Palmes, Prof. Dr. med. Dipl.-Ing.HU Spiegel; Inaugural dissertation to obtain the doctor rerum medicinalium from the Medical Faculty of the Westphalian Wilhelms-University in Munster, clinic for General and Visceral Surgery, Department of Surgical Research, University Hospital Munster, Germany; October 2015).

The decisive factor for a targeted treatment success using nuclear magnetic resonance is the precise determination of the cell resonance window of the individual cell groups to be regenerated.

Different cell groups have different low-frequency resonance response patterns, which is exploited in treatments with nuclear magnetic resonance.

One focus of current treatments with nuclear magnetic resonances are pain patients who suffer from degenerative changes of the musculoskeletal system such as joint arthrosis, osteoporosis, and sports and accident injuries.

For example, the article: Kullich W., J. Overbeck, H. U. Spiegel (2013): One-year-survey with multicenter data of more than 4,500 patients with degenerative rheumatic diseases treated with therapeutic nuclear magnetic resonance. J Back Musculoskelet Rehabil 26, 93-104, describes a significant improvement in pain symptoms in rheumatism patients through treatment with MBST® nuclear magnetic resonance therapy.

The MBST® therapy systems operate at lower field strengths than the imaging nuclear magnetic resonance tomography apparatuses used for diagnosis. However, surprisingly, it has been found that good treatment successes can be achieved precisely with this type of systems which work at low field strengths.

It has further been found that the efficacy of the treatment also depends, inter alia, on the modulation frequency of the homogeneous field, the number of treatments, the duration of treatment, and on the intervals, that is the time period between multiple treatments.

Depending on the indication, such parameters were initially determined empirically in order to determine and verify optimal treatment parameters to further improve the effectiveness of the MBST® therapy and expand the range of indications for application.

OBJECT OF THE INVENTION

Given this background, the invention is based on the object to provide a method for adjusting an apparatus for treatment using nuclear magnetic resonances, in particular in terms of targeted control, value acquisition, readjustment and calibration, which allows to set the parameters of the apparatus more precisely in a simpler and more effective way, depending on the indication.

SUMMARY OF THE INVENTION

The object of the invention is already achieved by a method for adjusting, in particular calibrating an apparatus for treatment using nuclear magnetic resonances, by a treatment system, and by the use of nuclear magnetic resonances according to any one of the independent claims.

Preferred embodiments and refinements of the invention are specified by the subject-matter of the dependent claims, the description and the drawings.

The invention relates to a method for adjusting, in particular for selective control, value acquisition, readjustment, and in particular a method for calibrating an apparatus for treatment using nuclear magnetic resonances.

The invention in particular relates to apparatuses for generating nuclear magnetic resonances which generate magnetic fields with a field strength of less than 50 Gauss, most preferably less than 30 Gauss, and modulation frequencies $f_m$ of less than 100 Hz.

The frequency of the perpendicularly irradiated alternating field is preferably less than 100 kHz and most preferably less than 50 kHz.

The modulation frequency $f_m$ is preferably between 1 and 100 Hz.

According to the invention, the influence of the treatment using nuclear magnetic resonances on the cellular clock of a user and/or on the chronotype of a user is determined, and the apparatus for treatment using nuclear magnetic resonances is adjusted on the basis of this determination.

According to the invention, it is also possible to expose a human cell culture or a cell culture of animal origin to a treatment with nuclear magnetic resonances, and the influence of the treatment with nuclear magnetic resonances on the cellular clock of the cells of the cell culture is determined.

In particular cell cultures of human origin such as liver cells or cartilage cells can be used.

Studies in the field of liver regeneration show that the cell division rate can both be slowed down or accelerated by changing the treatment parameters (see N. Budny, Spiegel et al.). During cell division, messenger substances were observed which are able to substantially accelerate cell division and thus regeneration.

For adjusting, in particular calibrating the apparatus, the influence of the treatment with nuclear magnetic resonances on the circadian clock of the respective cell type is determined. For this purpose, the parameters used for executing the treatment are varied, and the parameters for the treatment are set as a function of their influence on the circadian clock.

Furthermore, it is known that all organisms living in light, and thus also humans, have an inner circadian clock which enables to maintain time perception without external stimuli such as light for several days at the cellular level, via transcriptional and metabolic processes. This circadian clock is mutually related to the hypoxia signaling pathway. It is known that the hypoxia-inducible factor 1 (Hif-1α) is responsible for the expression of erythropoietin, inter alia, and for the strongly changed metabolism in adaptation to low oxygen concentrations, in particular the glucose metabolism can be mentioned here.

In addition, there are a large number of genes that are regulated by Hif-1 and play a role in many cell circuits, for example in cell proliferation, apoptosis, or new vascularization.

In this regard, reference is made in particular to the following publications:

Egg, M.; Paulitsch, M.; Ennemoser, Y.; Wustenhagen, A.; Schwerte, T.; Sandbichler, A. M.; Fiechtner, B.; Köblitz, L.; Prem, C.; Pelster, B. (2014): Chronodisruption increases cardiovascular risk in zebrafish via reduced clearance of senescent erythrocytes. In: CHRONOBIOLOGY INTERNATIONAL 31/5, pp. 680-689. (DOI).

Egg, M.; Köblitz, L.; Hirayama, J.; Schwerte, T.; Folterbauer, C.; Kurz, A.; Fiechtner, B.; Most, M.; Salvenmoser, W.; Sassone-Corsi, P.; Pelster, B. (2013): Linking oxygen to time: The bidirectional interaction between the hypoxic signaling pathway and the circadian clock. In: CHRONOBIOLOGY INTERNATIONAL 30/4, pp. 510-529.

Pelster, B.; Egg, M. (2015): Multiplicity of Hypoxia-Inducible Transcription Factors and Their Connection to the Circadian Clock in the Zebrafish. In: PHYSIOLOGICAL AND BIOCHEMICAL ZOOLOGY 88/2, pp. 146-157. (DOI).

Sandbichler, A. M.: Jansen, B.; Peer, B. A.; Paulitsch, M.; Pelster, B.; Egg, M. (2018): Metabolic Plasticity Enables Circadian Adaptation to Acute Hypoxia in Zebrafish Cells. In: CELLULAR PHYSIOLOGY AND BIOCHEMISTRY 46/3, pp. 1159-1174. (DOI)

In mammals and thus also in humans, the circadian clock is structured hierarchically and includes a region that is located in the hypothalamus, known as suprachiasmatic nucleus (SCN), as well as peripheral clocks that are organ-specific and/or tissue-specific, and cellular clocks that are present in all cells of an organism and which are coordinated by the SCN together with the peripheral clocks. The synchronization of the internal clock with the external day/night rhythm occurs mainly via the information from light photons which are transmitted to the SCN through the retina of the eye and cause both neuronal and humoral changes there. In all organisms living in light, including humans, many physiological processes are regulated in a circadian manner. These include in particular body temperature, blood pressure, skin resistance, and heart activity, as well as hormone secretion or organ-specific activity (the activity of the liver, kidney, heart, etc. is subject to a respective specific day/night rhythm). Circadian rhythms synchronized with the external day/night rhythm are an advantage for the organism, and prolonged disturbances of this synchronization (caused by shift work, jet lag, or sleep disorders) contribute to the development of a whole range of diseases, such as cardiovascular diseases, hormone-induced tumors, diabetes, obesity, but also pain and inflammatory diseases such as arthrosis.

The simplified molecular mechanism of the cellular circadian clock consists of several feedback loops, of which the central feedback loop is described below:

In the central negative feedback loop, the Brain and Muscle ARNT-like protein (Bmal1) and the "Circadian locomotor output cycles kaput 1" (Clock1) protein dimerize and bind to E-box promoter elements on the DNA of their antagonists, the genes Period (Per1-3) and Cryptochrome (Cry1/2). As a result, the expression of the mRNA of these genes and therefore also of their protein products increases in the cytoplasm, where both proteins attach to one another and dimerize. From there, they again migrate into the nucleus, where the protein complex inhibits the gene expression of Clock/Bmal1. The negative feedback loop is completed by phosphorylation of the PER/CRY complex by casein kinase Iε (CKIε) and subsequent degradation in the proteasome.

Well-known representatives of this central feedback loop include the "clock genes" clock1, bmal1, per1, per2, cry1, and cry2.

On the molecular level, the hypoxia signal path is closely intertwined with the internal clock, for example in zebrafish as well as in mammals. So, since the two signal paths are obviously very conserved processes, it is also permissible to draw conclusions about an existing interaction of both signal paths in humans. The hypoxia signal path, in turn, also plays a central role in numerous human diseases, like the circadian clock. In particular diseases associated with reduced oxygen saturation in the tissue can be mentioned here, such as e.g. heart attack or stroke, or else diseases where reduced oxygen saturation is required under normal physiological conditions, such as in joints. In particular osteoarthritis should be mentioned here and, in fact, the importance of the hypoxia signaling pathway for the development and progression of osteoarthritis has been investigated and described several times.

The biologically necessary proteins that regulate and coordinate cell metabolism under hypoxia are transcription factors from the group of hypoxia-inducible factors (Hif), the most important representative thereof being Hif-1α.

Both signaling pathways, the circadian clock and the hypoxia signaling pathway are furthermore mutually dependent on the available amount of free oxygen radicals (ROS), which in turn is compartmentalized and regulated very strictly under physiological conditions, by various enzymatic oxygen radical scavengers (antioxidants) such as, e.g., catalase, superoxide dismutase, glutathione peroxidase, or else by what is known as peroxiredoxins (PRX), low molecular weight proteins which themselves are also subject to circadian reduction and oxidation cycles. The role of free oxygen radicals (ROS) in inflammatory processes and also in the natural cellular aging process has already been extensively discussed and described and is still in the focus of current research.

It has now been found that the oscillations of the circadian genes period1 and cryptochrome1, for example of zebrafish fibroblast cell line Z3, are significantly shifted in their phases by a treatment using nuclear magnetic resonances. This phase shift occurs under complete exclusion of light (see FIG. 1). In addition, the expression of oxygen-regulating genes such as hif-1α and hif-3α on the mRNA level is significantly changed in cells and in whole zebrafish larvae (FIGS. 2, A, B, E, and F), while the isoform hif-2α is not affected at all (FIGS. 2, C, and D), which is again an indication for the specific and selective effect of nuclear magnetic resonances on HIF isoforms.

On the hif-1α protein level, a clear synchronization effect of the nuclear magnetic resonances to the circadian rhythm of the protein can be found in the cell culture (FIGS. 3, A and B), which occurs both with a single 4-hour treatment and also with four repetitions of a one-hour treatment. Furthermore, the amount of oxidized peroxiredoxin (PRX), free oxygen radicals, and HIF-1 protein (FIGS. 4, A, B, and C) are regulated in the same direction, in the present case reduced, as a function of day time and of dose.

Due to this new knowledge it is possible to adjust and employ an apparatus for obtaining nuclear magnetic resonances in such a way that improved treatment success can be achieved.

For example, a microcomputer chip card can be used to enter stored treatment sequences into the control unit via a chip card reader, and to ensure precise and correct execution of the nuclear magnetic resonance treatment.

A plurality of optional successive treatment time intervals which can be stored on the chip card, for example, ensure optimum control specifications for the treatment apparatus.

The sequences on the microcomputer chip card, the treatment procedure, and the treatment time can be selectively changed to initiate the resonance effects during the treatment time. This is crucial for triggering the resynchronization of the circadian clock of the cells.

A receiver coil introduced into the treatment unit and including monitoring electronics can be used to optically and acoustically monitor the proper operation of the nuclear magnetic resonance treatment field, treatment parameters, changes in field strength and intensity, the energy dose introduced into the body, the required resonance conditions, and other predetermined decisive verification parameters, and can be used for readjustment processes in terms of quality, effectiveness and safety.

This readjustment for optimizing the treatment parameters may be implemented through a feedback loop.

Further monitoring electronics measure and monitor temperature changes in the area of the skin in order to identify metabolic changes and to consider them in the control and monitoring process of the control electronics of the treatment procedure, as optimization parameters.

The apparatus may in particular be parameterized and used in a way so as to achieve synchronization of the cellular circadian clock. This improves the effectiveness of a treatment, in particular the effectiveness of a treatment for osteoarthritis patients.

In particular the time of treatment, the duration of treatment, the treatment interval, i.e. the time period between treatments, a modulation frequency of a field for an adiabatic cycle and/or a field strength of a magnetic field generated by the apparatus for treatment with magnetic fields are adjusted as a function of the respective phase of the cellular clock.

In terms of treatment interval, treatment is performed in a 12-hour or 24-hour rhythm +/−2 hours according to one embodiment of the invention. Other treatment intervals are also possible.

The apparatus used for this purpose preferably includes a memory which stores parameterization data such as treatment duration, modulation frequency $f_m$, and/or treatment interval as well as patient data.

Based thereon, a treatment plan may be stored in the apparatus, so that the apparatus will only perform a treatment if this is performed in compliance with the stored treatment plan.

According to the invention, the individual circadian clock, i.e. the chronotype, of the user is taken into account for calibration of the apparatus.

There are basically two chronotypes in humans (with intermediate forms in between), one that is known as morningness ("the lark") and the other known as eveningness ("the owl"), which have already been characterized physiologically.

Particularly suitable for this purpose are the measurement of body temperature, heart rate, skin resistance, and/or blood pressure over a period of preferably at least 24, more preferably at least 48 hours, to represent the individual circadian clock of the user.

In particular the treatment intervals and/or the optimum day time of the treatment can be determined on this basis.

The invention furthermore relates to an apparatus for treatment using nuclear magnetic resonances, which is adjusted by the method described above.

The invention moreover relates to a treatment system comprising an apparatus for treatment using nuclear magnetic resonances. The treatment system comprises means for determining the chronotype of a user, in particular a sensor.

According to one embodiment of the invention, the sensor is configured for measuring the body temperature, blood pressure, skin resistance, and/or heart rate of a user.

In one embodiment of the invention, a combined sensor is provided, which measures body temperature, skin resistance, and heart rate over a period of at least 24 hours, preferably at least 48 hours.

In another embodiment, the skin resistance is measured over this period of time, preferably exclusively. In this regard, reference is made to Vidacek et al: Personality differences in the phase of the circadian rhythms: a comparison of morningness and extraversion, ERGONOMICS 1988, Vol. 31, No. 6, 873-888, from which it is known that the skin resistance alone can be used to determine the chronotype.

On the basis of the measured values, the chronotype may be calculated in an external unit in which the sensor is arranged, or in the control unit of the apparatus for generating nuclear magnetic resonances, or in another external computer unit.

What is crucial is that the control unit of the apparatus for generating nuclear magnetic resonances is provided with information about the chronotype of the user.

According to one embodiment, the sensor transmits data to a control unit of the apparatus in a wireless manner.

According to another embodiment, the data measured in an external unit comprising the sensor are stored, and are transferred, in particular to a control unit of the apparatus, by connecting the external unit thereto.

The information about the chronotype of the users may be stored in an external memory, but also in a memory of the control unit of the apparatus for treatment using nuclear magnetic resonances.

The apparatus for generating nuclear magnetic resonances is preferably controlled through a removable memory, in particular through a complex microprocessor chip card that includes a memory. This is used to initiate the biological processes of retriggering the circadian clock, via a plurality of programmable program steps with modifiable timing.

The treatment procedure is preferably automated and runs through a plurality of program steps with predefined timing.

The treatment data and treatment times are preferably buffered in the control unit in order to allow to continue the treatment without treatment gaps or corruption in the event of a power failure.

In another embodiment, the biological and electrical patient data: are measured by means of sensors prior to the therapy on the patient are stored; and are then used directly for the treatment process as a reference or treatment basis, or are entered into the control unit before starting the therapy.

For adjusting the apparatus, the individual circadian clock of the user can be taken into account, via the data from the sensor. In particular treatment time, treatment duration, treatment intervals, and/or the modulation frequency $f_m$ may be predetermined as a function of the data transferred from the sensor.

The invention relates to the use of nuclear magnetic resonances for synchronizing and/or re-clocking the circadian clock of the cells of a user. It has been found that in particular the period1 and cryptochrome1 mRNA oscillations can be shifted in their phases by a selective nuclear magnetic resonance treatment to thereby synchronize the circadian clock. Furthermore, the circadian oscillation of HIF-1α protein at cell level is also synchronized by nuclear magnetic resonances. Moreover, time- and dose-dependent changes can be produced in HIF-1, PRX, and in the amount of free oxygen radicals; the significance of this for human pathophysiology has already been mentioned (cf. above).

The use of nuclear magnetic resonances according to the invention relates to an exclusively cosmetic treatment, in particular the treatment of cellulite, as well as to a therapeutic, in particular postoperative treatment.

The nuclear magnetic resonance method can be applied very efficiently and highly effectively in any context of disturbed or degenerative cell functions in the area of the joints of the bones, of organs, ligaments, muscles, tendons, in postoperative wound healing, skin burns, metabolism or circulatory disorder in the area of the bone, fracture healing, etc., as well as in other regenerative areas.

Depending on the desired purpose, the parameters of the treatment using nuclear magnetic resonances, in particular the day time of treatment, treatment interval, treatment duration and/or the modulation frequency $f_m$, are set or entered in such a way that a maximum phase shift or a minimum phase shift, or the best possible synchronization of the circadian clock is resulting.

BRIEF DESCRIPTION OF THE DRAWINGS

The subject-matter of the invention will now be explained in more detail with reference to the drawings of FIGS. 1 to 5.

DETAILED DESCRIPTION OF THE DRAWINGS

Referring to the graphs of FIGS. 1 through 6, the influence of a treatment using nuclear magnetic resonances on various biological parameters will now be explained.

Figure 1:
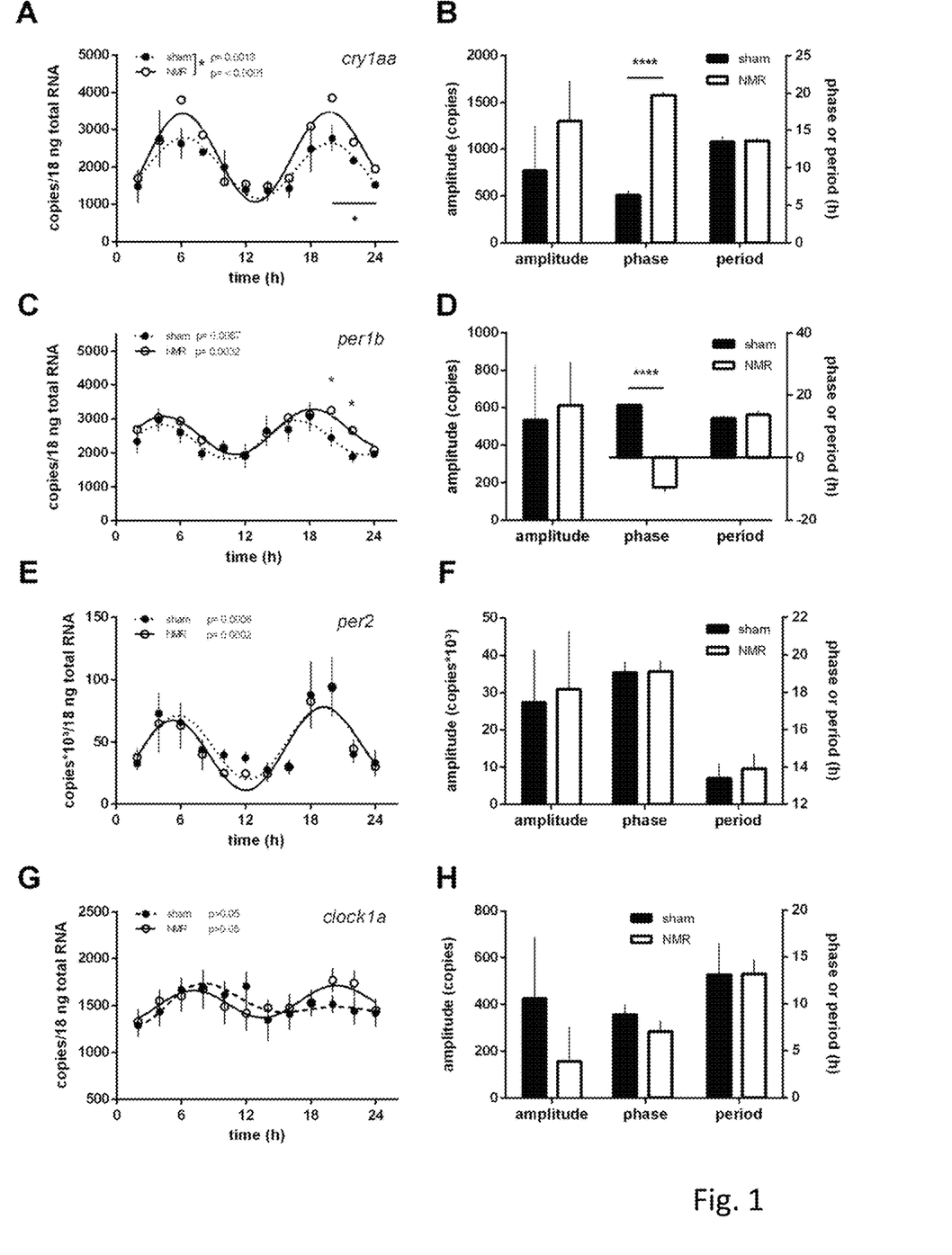
FIG. 1 shows the number of mRNA copies of representative genes from the central feedback loop of the internal clock, plotted over time, representing the oscillation of the internal clock. Shown are the oscillations of cryptochrome1, period1, period2, and clock1. A comparison is shown of oscillations between sham-treated cells and those treated with nuclear magnetic resonances for one hour on four consecutive days at the same time in each case. The phase shift can be clearly seen, it is significant for the period1 and cryptochrome1 genes, (cosinor fit analysis, GraphPad Prism 6.0)
Figure 2:
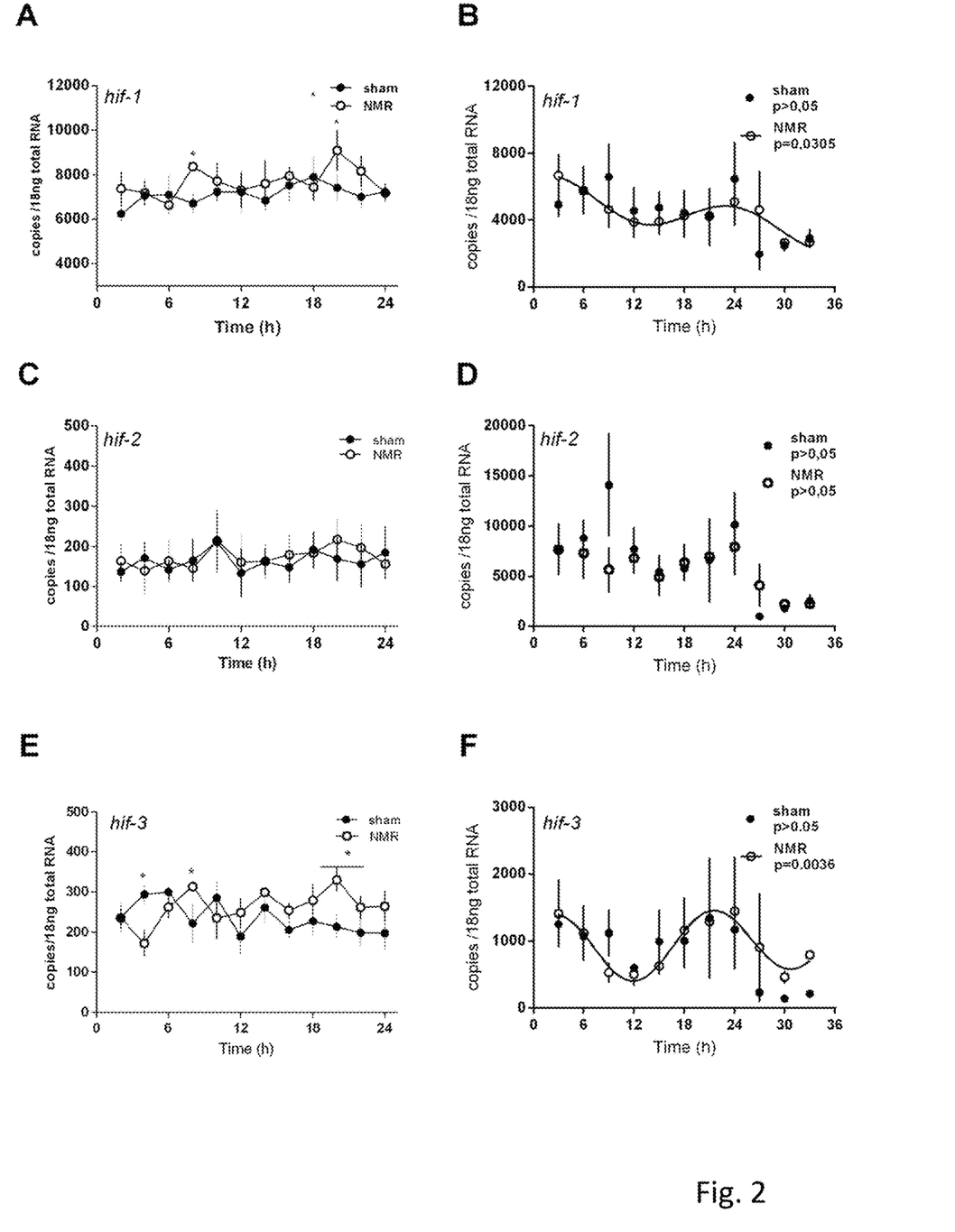
FIG. 2 shows the changes in mRNA concentrations of hif-1α and hif-3α from the hypoxia signaling pathway between sham-treated cells and those treated with nuclear magnetic resonances for one hour on four consecutive days at the same time (A and E), and the selective synchronization of mRNA oscillations of hif-1α and hif-3α in whole zebrafish larvae according to the same treatment scheme (B and F), while hif-2α remains unaffected both in cells and in whole zebrafish larvae (FIGS. 2, C and D).

In each of FIGS. 1 and 2, the x-axis represents the day time and the y-axis represents the specific number of mRNA copies based on 16 ng of total RNA. In each case, a sham-treated control group is compared to a cell culture that was treated with an MBST® therapy apparatus on four consecutive days for one hour in each case. The treatment was carried out at the same time of day.

A cell culture of zebrafish fibroblasts was used for this purpose.

FIG. 1 shows the mRNA oscillations of the genes cryptochrome1, period1, period2, and clock1.

It can be seen that the circadian mRNA oscillation of the genes period1 and cry1 is shifted by about two hours, compared to the sham-treated control cells. Thus, the phases of these gene oscillations were successfully shifted without the external influence of light. A significant difference in the treatment groups is apparent, which was statistically proven by a cosine curve fit (Graphpad Prism 6).

FIG. 2 shows the mRNA quantities of the genes hif-1α, hif-2α, and hif-3α over the course of the day.

It can be seen that the isoforms hif-1α and hif-3α are selectively controlled by nuclear magnetic resonances, on cell level (A and E) as well as in the whole organism (B and F), while hif-2α remains unaffected both in cells and in whole zebrafish larvae.

Figure 3:
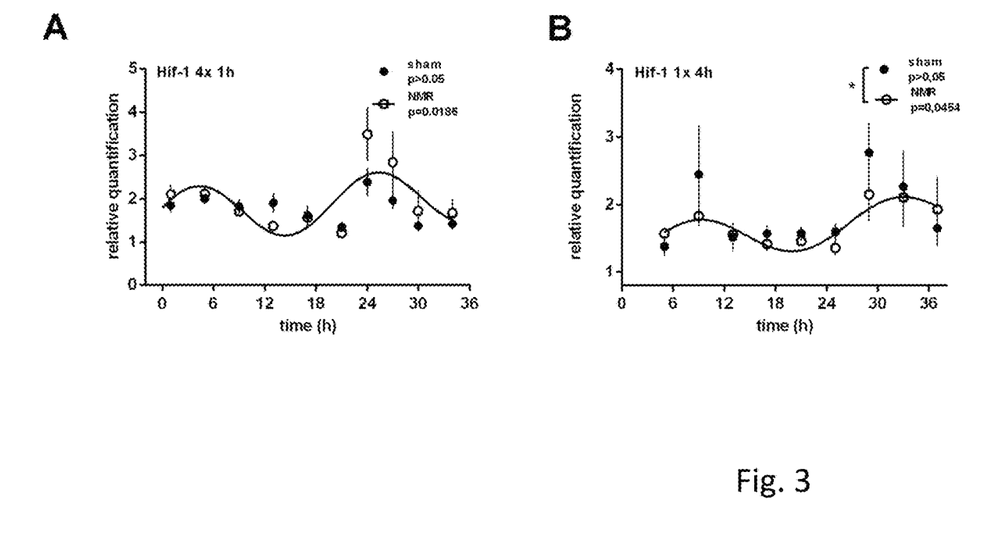
FIG. 3 shows the synchronization of the circadian hif-1 protein oscillations in zebrafish cells achieved by nuclear magnetic resonances, on the one hand after a one-hour treatment that was repeated four times (A), on the other after a single four-hour treatment (B).

FIG. 3 shows the quantities of hif-1α protein of cells over the course of the day. It can be seen that nuclear magnetic resonances cause a synchronization of the circadian rhythm of hif-1α protein expression in both treatment variants (four times one hour [A]—compared to a single treatment over four hours [B]).

Figure 4:
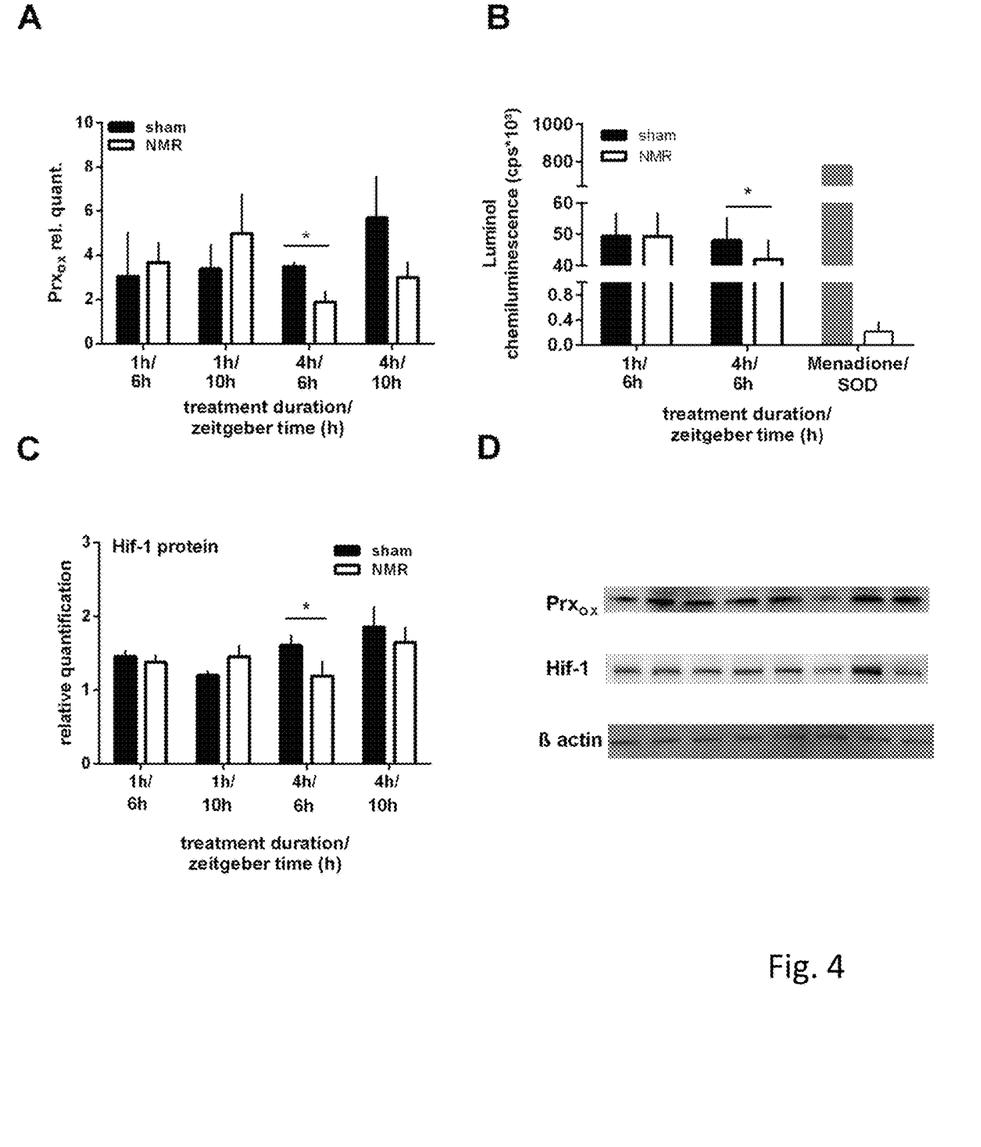
FIG. 4 shows the reduced and dose-dependent amounts of oxidized peroxiredoxin (A), free oxygen radicals (B), and hif-1α protein (C). A 4-hour treatment leads to a reduction in the amount of protein and the amount of free oxygen radicals, respectively, compared to a treatment of only one hour.

FIG. 4 shows a dependence of the effect of nuclear magnetic resonances on the dose: only a 4-hour single treatment shows a significant reduction in the quantities of oxidized Prx (A), free oxygen radicals (B), and hif-1α (C), in contrast to a single treatment of only one hour.

Figure 5:
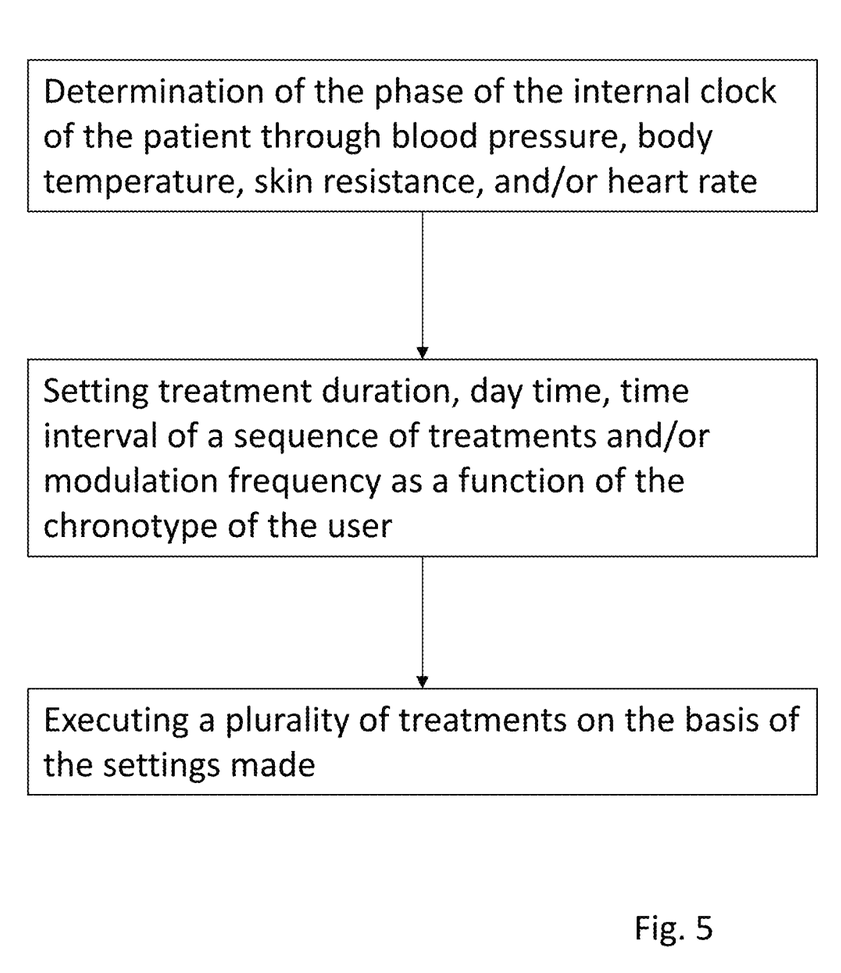
FIG. 5 is a schematic flowchart of a method for adjusting an apparatus for treatment using nuclear magnetic resonances.

FIG. 5 is a flowchart of a method for adjusting an apparatus for treatment using nuclear magnetic resonances according to an exemplary embodiment of the invention.

First, the phase of the internal clock of the patient is determined through skin resistance, blood pressure, body temperature, and/or heart rate, i.e. the individual chronotype is determined.

On this basis, the treatment duration, time interval of a sequence of treatments, day time window for treatment, and/or modulation frequency $f_m$ of the apparatus for treatment using nuclear magnetic resonances are set as a function of the chronotype.

Based on this setting, a plurality of treatments are executed. These may be therapeutic treatments or else cosmetic treatments.

Figure 6:
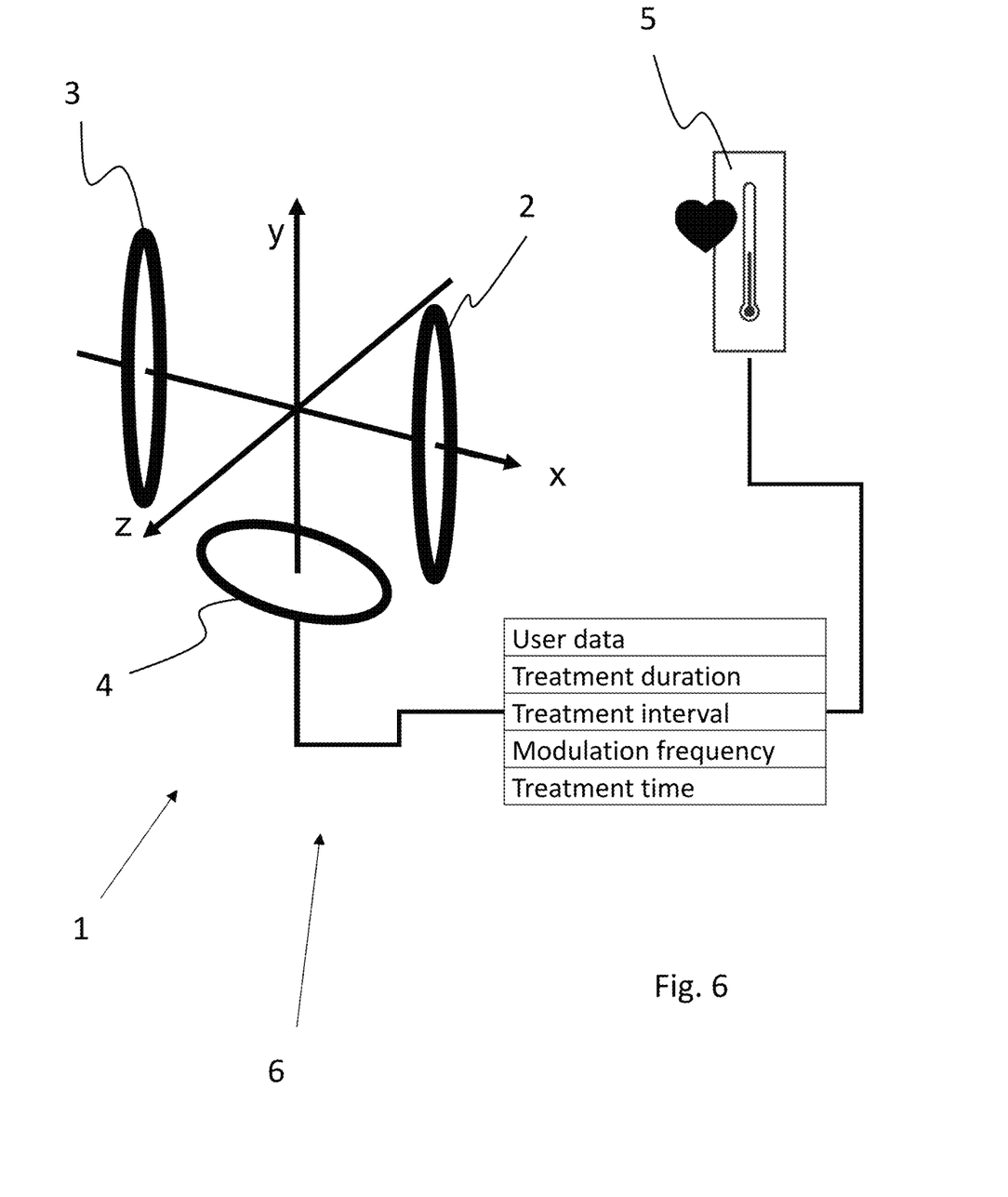
FIG. 6 is a schematic view of an apparatus for treatment using nuclear magnetic resonances.

FIG. 6 is a schematic view of a system 6 according to the invention for treating a user with nuclear magnetic resonances. The system 6 comprises an apparatus 1 for generating nuclear magnetic resonances in a tissue to be treated.

The apparatus 1, shown schematically here, comprises coils 2 and 3 which face each other in a Helmholtz arrangement and which are used to generate a homogeneous magnetic field that extends along the direction of the indicated x-axis.

In order to generate a nuclear magnetic resonance, an alternating magnetic field is irradiated by coil 4, perpendicular to the homogeneous magnetic field generated by coils 2 and 3.

Its frequency is tuned such that the Larmor condition is achieved.

Furthermore, the homogeneous field generated by coils 2 and 3 is composed of a basic magnitude and a modulation magnitude which is modulated by modulation frequency $f_m$, for example in a rectangular shape.

Due to the modulation, the resonance condition is generated at least once during each cycle within the treatment volume.

The apparatus 1 comprises a memory which stores user data, data on the duration of treatment, the treatment interval and the modulation frequency $f_m$.

The time window of the treatment, treatment duration, treatment interval, and/or modulation frequency are performed as a function of the chronotype of the person to be treated.

According to the invention, the system 6 comprises means for determining the chronotype of the user.

In the present case, this is a sensor 5 which forms part of an external unit that can be attached to the user and transfers data to a control unit of the apparatus 1, preferably in a wireless manner. This may also be achieved via the Internet, for example.

By way of example, the sensor 5 is able to measure heart rate, body temperature, or skin resistance over a period of at least 24 hours. On the basis of the measured values, the chronotype of the respective user is determined.

Depending on the phase of the circadian clock of the user, a treatment profile with optimized treatment parameters can now be established, preferably automatically by the control unit of the apparatus.

This applies in particular to the day time at which the treatment is to be performed.

The apparatus 1 preferably comprises an apparatus control unit which also includes the memory with the aforementioned data, and the control unit of the apparatus calculates optimized treatment parameters preferably automatically, for example on the basis of a calculation program or on the basis of a database, and stores them in the memory in association with the respective user data.

The setting of the parameters of the treatment apparatus on the basis thereof allows to improve, in a simple way, the effectiveness of the treatment with nuclear magnetic resonances.

A microcomputer chip card is used to enter the stored treatment sequences into the control unit, via a chip card reader, which ensures the targeted and proper execution of the MBST® nuclear magnetic resonance treatment.

The sequences on the microcomputer chip card, the treatment procedure, and the treatment time can be selectively modified, verified and readjusted in order to initiate the resonance effects during the treatment duration.

This is crucial for the highly significant increase in ATP and the hypoxia level of the cells and for triggering the resynchronization of the circadian clock of the cells.

Studies have shown that the defense of the immune system can be enhanced and that degenerated cell functions can be eliminated thereby.

The invention claimed is:

1. A method for adjusting an apparatus for treatment using nuclear magnetic resonances, the apparatus comprising two coils, which face each other, and which are used to generate a homogeneous magnetic field, and wherein a nuclear magnetic resonance is generated via a further coil that irradiates an alternating magnetic field, the method comprising: treating a cell culture or one or more cells of a user with the nuclear magnetic resonances generated by the apparatus, determining an influence of the treatment with nuclear magnetic resonances on: a cellular clock of the cell culture, or a cellular clock of the user and a chronotype of the user, or a cellular clock of the user, or a chronotype of the user, and setting the field strength of the homogenous magnetic field and the modulation frequency of the homogeneous field of the apparatus for treatment using nuclear magnetic resonances on a basis thereof, wherein the nuclear magnetic resonances are used for synchronizing and/or re-clocking the cellular clock of the cells of the cell culture or of the user, the synchronizing and/or re-clocking being a specific effect of the nuclear magnetic resonances, wherein the synchronizing and/or re-clocking by nuclear magnetic resonances includes synchronizing and/or re-clocking of cellular circadian oscillations.

2. The method as claimed in claim 1, further comprising setting a treatment duration, or a treatment interval, or a day time of the treatment, or a field strength of the alternating magnetic field, or any combination thereof, as a function of the cellular clock of the cell culture, or the cellular clock of the user, or the chronotype of the user.

3. The method as claimed in claim 1, wherein the influence of the treatment with the nuclear magnetic resonances is determined on the chronotype of the user, and wherein the apparatus is set depending on the chronotype of the user.

4. The method as claimed in claim 3, wherein the chronotype of the user is determined by temperature measurement, blood pressure measurement, measurement of skin resistance, determination of heart rate, or any combination thereof.

5. An apparatus for treatment using nuclear magnetic resonances, the apparatus comprising:
   two coils, which face each other, and which are configured to generate a homogeneous magnetic field; and
   a further coil which is configured to irradiate an alternating magnetic field to generate a nuclear magnetic resonance;
   wherein the apparatus is adjusted by determining an influence of the treatment with the nuclear magnetic resonances on: a cellular clock of a cell culture, or a cellular clock of a user and a chronotype of the user, or a cellular clock of a user, or a chronotype of the user, and setting the field strength of the homogenous magnetic field and the modulation frequency of the homogeneous field of the apparatus for treatment using the nuclear magnetic resonances on a basis thereof, wherein the nuclear magnetic resonances are used for synchronizing and/or re-clocking the cellular clock of the cells of the cell culture or of the user, the synchronizing and/or re-clocking being a specific effect of the nuclear magnetic resonances, wherein the synchronizing and/or re-clocking by nuclear magnetic resonances includes synchronizing and/or re-clocking of cellular circadian oscillations.

6. A treatment system comprising an apparatus for treatment using nuclear magnetic resonances, the apparatus comprising:
   two coils, which face each other, and which are configured to generate a homogeneous magnetic field; and
   a further coil which is configured to irradiate an alternating magnetic field to generate a nuclear magnetic resonance;
   wherein the treatment system comprises means for determining the chronotype of the user,
   wherein the nuclear magnetic resonances are configured for synchronizing and/or re-clocking a cellular clock of cells of a user or of cell culture, the synchronizing and/or re-clocking being a specific effect of the nuclear magnetic resonances, wherein the synchronizing and/or re-clocking by nuclear magnetic resonances includes synchronizing and/or re-clocking of cellular circadian oscillations.

7. The treatment system of claim 6, further comprising a sensor configured for measuring a body temperature, a blood pressure, a skin resistance, a heart rate of the user, or any combination thereof.

8. The treatment system as claimed in claim 6, further comprising a sensor configured for transmitting data to a control unit of the apparatus.

9. The treatment system as claimed in claim 6, further comprising a sensor, which is part of an external unit.

10. A method of using nuclear magnetic resonances, comprising:
    with two coils facing each other, generating a homogeneous magnetic field;
    with a further coil, generating a nuclear magnetic resonance by irradiating an alternating magnetic field;
    altering a circadian clock of cells of a user with the nuclear magnetic resonance, wherein the nuclear magnetic resonances are used for synchronizing and/or re-clocking the circadian clock of the cells of the user, the synchronizing and/or re-clocking being a specific effect of the nuclear magnetic resonances, wherein the synchronizing and/or re-clocking by nuclear magnetic resonances includes synchronizing and/or re-clocking of cellular circadian oscillations.

11. The method according to claim 10, wherein the nuclear magnetic resonance alters the circadian clock for therapeutic and/or cosmetic purposes.

12. The method according to claim 10, wherein the nuclear magnetic resonance alters a hypoxia signaling pathway of cells of the user.

13. The method according to claim 10, wherein the nuclear magnetic resonance alters an amount of free oxygen radicals of cells of the user.

14. A method for adjusting an apparatus for treatment using nuclear magnetic resonances, the apparatus comprising two coils, which face each other, and which are used to generate a homogeneous magnetic field, and wherein a nuclear magnetic resonance is generated via a further coil that irradiates an alternating magnetic field, the method comprising:
    determining a phase of a circadian clock of a user by means of a sensor, and
    establishing a treatment profile based on the phase of the circadian clock of the user, the treatment profile comprising at least a treatment duration and a treatment interval, or a day time of the treatment, or a modulation frequency of the homogeneous field, or a field strength of the homogenous magnetic field generated by the apparatus for treatment using magnetic fields, or a field strength of the alternating magnetic field, or any combination thereof, and setting the apparatus for treatment using nuclear magnetic resonances with the treatment profile, and treating one or more human or animal cells using the nuclear magnetic resonances generated by the apparatus, wherein the nuclear magnetic resonances are used for synchronizing and/or re-clocking a cellular clock of the one or more human or animal cells, the synchronizing and/or re-clocking being a specific effect of the nuclear magnetic resonances, wherein the synchronizing and/or re-clocking by nuclear magnetic resonances includes synchronizing and/or re-clocking of cellular circadian oscillations.

\* \* \* \* \*